United States Patent
Yang et al.

(10) Patent No.: US 11,803,079 B2
(45) Date of Patent: Oct. 31, 2023

(54) QUANTUM DOT DISPLAY PANEL, QUANTUM DOT DISPLAY DEVICE, AND PREPARATION METHOD THEREOF

(71) Applicant: WUHAN CHINA STAR OPTOELECTRONICS TECHNOLOGY CO., LTD., Wuhan (CN)

(72) Inventors: Chaoqun Yang, Wuhan (CN); Changchih Huang, Wuhan (CN); Yanchang Shi, Wuhan (CN); Wei Cheng, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 665 days.

(21) Appl. No.: 16/960,386

(22) PCT Filed: May 22, 2020

(86) PCT No.: PCT/CN2020/091750
§ 371 (c)(1),
(2) Date: Jul. 7, 2020

(87) PCT Pub. No.: WO2021/208182
PCT Pub. Date: Oct. 21, 2021

(65) Prior Publication Data
US 2023/0123638 A1    Apr. 20, 2023

(30) Foreign Application Priority Data
Apr. 13, 2020    (CN) .......................... 202010283412.6

(51) Int. Cl.
*G02F 1/1335* (2006.01)
*G02F 1/017* (2006.01)
(Continued)

(52) U.S. Cl.
CPC .... *G02F 1/133528* (2013.01); *G02F 1/01791* (2021.01); *G02F 1/133512* (2013.01); *G02F 1/133602* (2013.01); *G02F 2/02* (2013.01)

(58) Field of Classification Search
CPC ... G02F 1/01791; G02F 2/02; G02F 1/133528
See application file for complete search history.

(56) References Cited

U.S. PATENT DOCUMENTS

2007/0014127 A1* 1/2007 Hara .................. G02B 6/005
362/611
2013/0242228 A1* 9/2013 Park .................. G02F 1/133528
257/E33.012
(Continued)

FOREIGN PATENT DOCUMENTS

CN    101211069 A    7/2008
CN    103105704 A    5/2013
(Continued)

*Primary Examiner* — Jonathan Y Jung
(74) *Attorney, Agent, or Firm* — PV IP PC; Wei Te Chung; Zhigang Ma (57) ABSTRACT

The present invention provides a quantum dot display panel, a quantum dot display device, and a preparation method thereof. The quantum dot display panel includes an array substrate, a color film substrate, and a liquid crystal disposed between the array substrate and the color film substrate, wherein the color film substrate includes a cover plate, a light-cutoff layer, a quantum dot pixel layer, a blocking layer, a reflection layer, a coating layer, a built-in polarizing layer, an isolation unit, and a polyimide (PI) layer.

9 Claims, 3 Drawing Sheets

(51) Int. Cl.
  *G02F 1/13357* (2006.01)
  *G02F 2/02* (2006.01)

(56) References Cited

U.S. PATENT DOCUMENTS

| | | | |
|---|---|---|---|
| 2015/0285969 A1* | 10/2015 | Kim | G02B 5/201 |
| | | | 359/891 |
| 2016/0357068 A1 | 12/2016 | Yang et al. | |
| 2017/0045778 A1 | 2/2017 | Cheng et al. | |
| 2017/0261806 A1* | 9/2017 | Niu | G02F 1/1368 |
| 2018/0246373 A1* | 8/2018 | Nakamura | G02B 6/0053 |
| 2018/0356688 A1 | 12/2018 | Chen | |
| 2020/0091226 A1* | 3/2020 | Hwang | H01L 33/405 |
| 2020/0133053 A1 | 4/2020 | Yang et al. | |

FOREIGN PATENT DOCUMENTS

| | | |
|---|---|---|
| CN | 104330918 A | 2/2015 |
| CN | 104360540 A | 2/2015 |
| CN | 104765187 A | 7/2015 |
| CN | 107092125 A | 8/2017 |
| CN | 109375410 A | 2/2019 |
| CN | 209992778 U | 1/2020 |
| WO | 2018034423 A1 | 2/2018 |

\* cited by examiner

QUANTUM DOT DISPLAY PANEL, QUANTUM DOT DISPLAY DEVICE, AND PREPARATION METHOD THEREOF

FIELD OF INVENTION

The present disclosure relates to the field of display technology, and more particularly, to a quantum dot display panel, a quantum dot display device, and a preparation method thereof.

BACKGROUND OF INVENTION

In pursuit of even better user experiences for panels, development and production of displays with higher color gamut and higher brightness have become goals pursued by various panel manufacturers.

With organic light emitting diode (OLED) technology taking the markets by storm, liquid crystal display (LCD) panels risk being eliminated. How to enhance one's competitiveness and secure a place in the market has become a most urgent key point for all panel manufacturers. Quantum dots have been widely used in a display field in recent years due to wide excitation wavelength, narrow half-width peak, high luminous efficiency, and adjustable colors. Moreover, its application in the LCDs not only allow continued usage of the LCD manufacturing process to a large extent, but also can improve color performance, which is a key area of competition between LCD and OLED technologies. At present, mass-produced products are based on quantum dot backlight technology, which can enable LCDs to achieve 110% color saturation (national television system committee, NTSC), much higher than the 90% to 100% NTSC level of traditional LCD display devices. Quantum dots directly applied in a color filter (CF) can further increase the color gamut to a BT2020 level of more than 90%. As a result, the color gamut and color purity of LCDs are even better than that of OLEDs. However, since quantum dots (QDs) are self-luminous materials, even if a single-piece polarizer is attached outside, the light cannot be turned on or off.

At present, studies have pointed out that a built-in polarizing layer in the LCD can control the on and off of an optical path, but how to achieve it is still rarely reported. Current technology adopts nanoimprint technology to manufacture a line grid polarizer in CF to realize the built-in polarizing layer, but the method requires complicated process and high cost. Therefore, a research of low cost and a process of simplifying the built-in polarizing layer is further needed.

SUMMARY OF INVENTION

The present disclosure provides a quantum dot display panel, a quantum dot display device, and a preparation method thereof to solve a problem that in prior art that natural light emitted by a quantum dot pixel layer cannot be controlled, and a manufacturing process of a built-in polarizing layer is complicated and cost is high.

An embodiment of the present disclosure provides a quantum dot display panel. The display panel comprises an array substrate, a color film substrate, a liquid crystal layer disposed between the array substrate and the color film substrate, wherein the color film substrate comprises a cover plate, a light-cutoff layer disposed on a surface of a side of the cover plate and provided with a plurality of through-holes, a quantum dot pixel layer disposed on a surface of a side of the light-cutoff layer away from the cover plate, wherein the quantum dot pixel layer comprises a plurality of quantum dot pixel units, each quantum dot pixel unit comprises a red sub-pixel, a green sub-pixel, a blue sub-pixel, and two quantum dot pixel layers in each quantum dot pixel unit have different colors, a blocking layer disposed on a surface of a side of the quantum dot pixel layer away from the light-cutoff layer, a reflection layer disposed on a surface of a side of the cover plate, filled in the plurality of through-holes, and surrounding the quantum dot pixel layer and the blocking layer, a coating layer disposed on a surface of a side of the reflection layer away from the cover plate and simultaneously disposed on a surface of a side of the blocking layer away from the quantum dot pixel layer, a built-in polarizing layer evenly coated on a surface of a side of the coating layer away from the reflection layer, an isolation unit disposed on a surface of a side of the built-in polarizing layer away from the coating layer, wherein an orthographic projection of the isolation unit on the cover plate overlaps with an orthographic projection of a part of the reflection layer on the cover plate, and a polyimide (PI) layer attached to a surface of a side of the built-in polarizing layer away from the coating layer and covering an outer surface of the isolation unit.

In some embodiments, a thickness of the built-in polarizing layer is less than 10 microns. A thickness of traditional polarizer is about 200 microns. Compared with thereof, the thickness of the built-in polarizing layer provided by the present disclosure is significantly reduced, which can further realize lightness and thinness.

In some embodiments, a material of the reflection layer is a reflective photoresist.

In some embodiments, the blocking layer consists of a solvent, a polymer, a photosensitizer, and an additive.

In some embodiments, the light-cutoff layer intercepts light with a wavelength below 492 nm.

In some embodiments, the quantum dot display panel further comprises an external polarizer, the external polarizer is disposed on a side of the array substrate away from the liquid crystal layer.

In some embodiments, a backlight source is disposed on a surface of a side of the external polarizer away from the array substrate. A polarizing function of the built-in polarizing layer realizes control of on and off of quantum dot natural light through a cooperation of the external polarizer, the built-in polarizing layer, and the liquid crystal layer.

In some embodiments, when a direction of light passing through the liquid crystal layer is perpendicular to a polarization direction of the built-in polarizing layer, the quantum dot pixel layer displays a dark state, and when the direction of light passing through the liquid crystal layer is parallel to the polarization direction of the built-in polarizing layer, the quantum dot pixel layer emits light and displays a light-emitting state.

Another embodiment of the present disclosure provides a quantum dot display device, and the quantum dot display device comprises the above quantum dot display panel. The display panel comprises an array substrate, a color film substrate, a liquid crystal layer disposed between the array substrate and the color film substrate, wherein the color film substrate comprises a cover plate, a light-cutoff layer disposed on a surface of a side of the cover plate and provided with a plurality of through-holes, a quantum dot pixel layer disposed on a surface of a side of the light-cutoff layer away from the cover plate, wherein the quantum dot pixel layer comprises a plurality of quantum dot pixel units, each quantum dot pixel unit comprises a red sub-pixel, a green sub-pixel, a blue sub-pixel, and two quantum dot pixel layers in each quantum dot pixel unit have different colors, a blocking layer disposed on a surface of a side of the quantum dot pixel layer away from the light-cutoff layer, a reflection layer disposed on a surface of a side of the cover plate, filled in the plurality of through-holes, and surrounding the quantum dot pixel layer and the blocking layer, a coating layer disposed on a surface of a side of the reflection layer away from the cover plate and simultaneously disposed on a surface of a side of the blocking layer away from the quantum dot pixel layer, a built-in polarizing layer evenly coated on a surface of a side of the coating layer away from the reflection layer, an isolation unit disposed on a surface of a side of the built-in polarizing layer away from the coating layer, wherein an orthographic projection of the isolation unit on the cover plate overlaps with an orthographic projection of a part of the reflection layer on the cover plate, and a polyimide (PI) layer attached to a surface of a side of the built-in polarizing layer away from the coating layer and covering an outer surface of the isolation unit.

In some embodiments, a thickness of the built-in polarizing layer is less than 10 microns. A thickness of traditional polarizer is about 200 microns. Compared with thereof, the thickness of the built-in polarizing layer provided by the present disclosure is significantly reduced, which can further realize lightness and thinness.

In some embodiments, a material of the reflection layer is a reflective photoresist.

In some embodiments, the blocking layer consists of a solvent, a polymer, a photosensitizer, and an additive.

In some embodiments, the light-cutoff layer intercepts light with a wavelength below 492 nm.

In some embodiments, the quantum dot display panel further comprises an external polarizer, the external polarizer is disposed on a side of the array substrate away from the liquid crystal layer.

In some embodiments, a backlight source is disposed on a surface of a side of the external polarizer away from the array substrate. A polarizing function of the built-in polarizing layer realizes control of on and off of quantum dot natural light through a cooperation of the external polarizer, the built-in polarizing layer, and the liquid crystal layer.

In some embodiments, when a direction of light passing through the liquid crystal layer is perpendicular to a polarization direction of the built-in polarizing layer, the quantum dot pixel layer displays a dark state, and when the direction of light passing through the liquid crystal layer is parallel to the polarization direction of the built-in polarizing layer, the quantum dot pixel layer emits light and displays a light-emitting state.

The other embodiment of the present disclosure provides a preparation method of the above quantum dot display device, wherein a preparation method of the color film substrate comprises following steps: providing a transparent cover plate; forming the light-cutoff layer on the transparent cover plate to filter out excess light; forming a quantum dot pixel structure on the light-cutoff layer, wherein the quantum dot pixel layer structure layer comprises a plurality of quantum dot pixel layer units; forming the blocking layer on the quantum dot pixel structure; forming the reflection layer on the transparent cover plate and surrounding the quantum dot pixel layer unit; forming the coating layer on the reflection layer and the blocking layer; coating a polarizer solution uniformly on the coating layer, and performing ultraviolet (UV) irradiation or heating thereof to form the built-in polarizing layer; forming the isolation unit on the built-in polarizing layer; and coating the PI layer on the built-in polarizing layer and the isolation unit.

The embodiment of the present disclosure provides the quantum dot display panel. The display panel comprises the array substrate, the color film substrate, the liquid crystal layer disposed between the array substrate and the color film substrate, wherein the color film substrate comprises the cover plate, the light-cutoff layer disposed on the surface of the side of the cover plate and provided with the plurality of through-holes, the quantum dot pixel layer disposed on the surface of the side of the light-cutoff layer away from the cover plate, wherein the quantum dot pixel layer comprises the plurality of quantum dot pixel units, each quantum dot pixel unit comprises the red sub-pixel, the green sub-pixel, the blue sub-pixel, and two quantum dot pixel layers in each quantum dot pixel unit have different colors, the blocking layer disposed on the surface of the side of the quantum dot pixel layer away from the light-cutoff layer, the reflection layer disposed on the surface of the side of the cover plate, filled in the plurality of through-holes, and surrounding the quantum dot pixel layer and the blocking layer, the coating layer disposed on the surface of the side of the reflection layer away from the cover plate and simultaneously disposed on the surface of the side of the blocking layer away from the quantum dot pixel layer, the built-in polarizing layer evenly coated on the surface of the side of the coating layer away from the reflection layer, the isolation unit disposed on the surface of the side of the built-in polarizing layer away from the coating layer, wherein the orthographic projection of the isolation unit on the cover plate overlaps with the orthographic projection of the part of the reflection layer on the cover plate, and the PI layer attached to the surface of the side of the built-in polarizing layer away from the coating layer and covering an outer surface of the isolation unit.

The embodiment of the present disclosure controls of on and off of quantum dot natural light through a cooperation of the external polarizer, the built-in polarizing layer, and the liquid crystal layer. Moreover, by directly coating the polarizing solution in a cell to manufacture the built-in polarizing layer, the process is simple and the cost is saved.

Figure numerals: backlight source 101, external polarizer 102, array substrate 103, polyimide (PI) layers 104 and 108, sealant 105, liquid crystals 106, isolation unit 107, built-in polarizing layer 109, coating layer 110, blocking layer 111, reflection layer 112, quantum dot pixel layers 113, 114, and 115, light-cutoff layers 116, 117, and 118, and transparent cover plate 119.

DETAILED DESCRIPTION OF PREFERRED EMBODIMENTS

The technical solutions in the embodiments of the present disclosure will be clearly and completely described below in conjunction with accompanying drawings in the embodiments of the present disclosure. Obviously, the embodiments described are merely a part of the present disclosure, rather than all the embodiments. All other embodiments obtained by the person having ordinary skill in the art based on embodiments of the disclosure, without making creative efforts, are within the scope of the present disclosure.

In descriptions of the present disclosure, it should be noted that, orientations or position relationships indicated by the terms, such as "center", "longitudinal", "transverse", "length", "width", "thickness", "upper", "lower", "front", "back", "left", "right", "vertical", "horizontal", "top", "bottom", "inside", "outside", etc. are based on the orientations or position relationships shown in the drawings. These are only convenience for describing the present disclosure and simplifying the descriptions, and does not indicate or imply that the device or element must have a specific orientation, a structure and an operation in the specific orientation, so it cannot be understood as a limitation on the present disclosure. In addition, the terms "first" and "second" are used for describing purposes only, and cannot be understood as indicating or implying relative importance or implicitly indicating the number of technical features indicated. Thus, the features defined as "first" and "second" may explicitly or implicitly include one or more of the features. In the descriptions of the present disclosure, the meaning of "plurality" is two or more, unless it is specifically defined otherwise.

In the present disclosure, the terms "mounting", "connected", "fixed" and the like should be broadly understood unless expressly stated or limited otherwise. For example, it may be fixed connected, removably connected, or integrated; it may be mechanically connected, or an electrically connected; it may be directly connected, or indirectly connected through an intermediary; it may be a connection between two elements or an interaction between two elements. For those skilled in the art, the specific meanings of the above terms in the present disclosure may be understood based on specific situations.

In the present disclosure, unless explicitly stated and defined otherwise, the first feature may be "above" or "below" the second feature and may include direct contact between the first and second features. It may also include that the first and second features are not in direct contact but are contacted by another feature between them. Moreover, the first feature is "above" the second feature, including the first feature directly above and obliquely above the second feature, or merely indicates that the first feature is higher in level than the second feature. The first feature is "below" the second feature, including the first feature is directly below and obliquely below the second feature, or only indicates that the first feature is less horizontal than the second feature.

The following disclosure provides many different embodiments or examples for achieving different structures of the present disclosure. To simplify the present disclosure, components and settings of specific examples are described below. They are only examples and are not intended to limit the present disclosure. In addition, the present disclosure may repeat reference numbers and/or reference letters in different examples, this repetition is for the purpose of simplicity and clarity, and does not itself indicate the relationship between various embodiments and/or settings discussed. In addition, the present disclosure provides examples of various specific processes and materials, but those of ordinary skill in the art may be aware of the present disclosure of other processes and/or the use of other materials.

Figure 1:
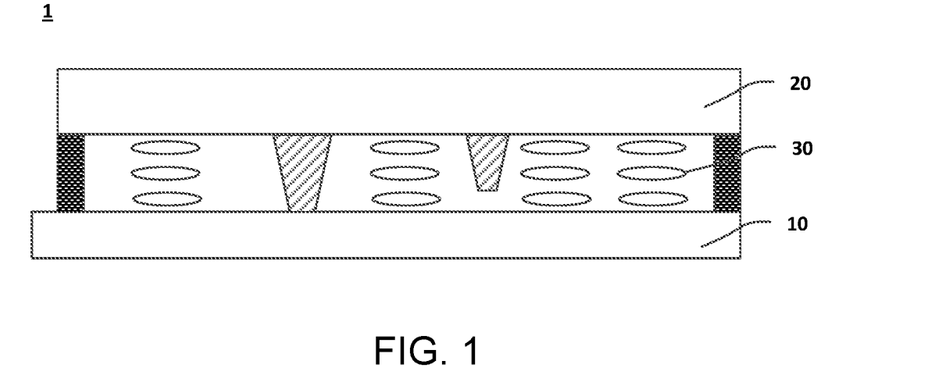
FIG. 1 is a schematic simple structural diagram of a quantum dot display panel provided by an embodiment of the present disclosure.

Specifically, as shown in FIG. 1, an embodiment of the present disclosure provides a quantum dot display panel 1 comprising an array substrate 10, a color film substrate 20, a liquid crystal layer 30 disposed between the array substrate 10 and the color film substrate 20.

Figure 2:
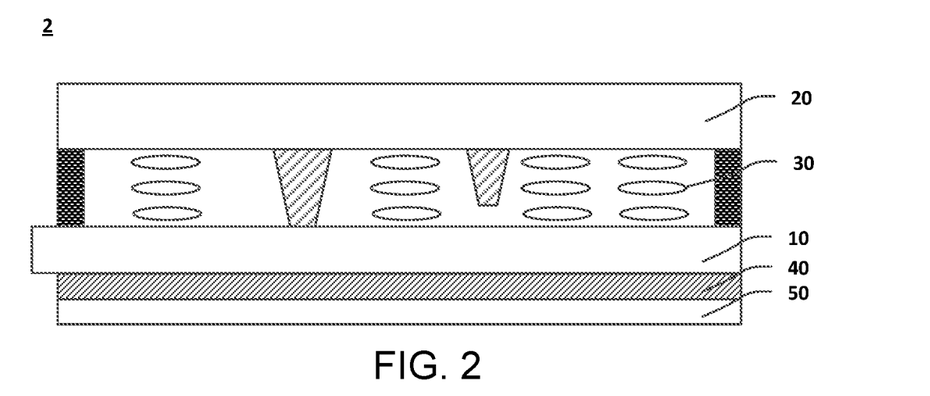
FIG. 2 is a schematic simple structural diagram of the quantum dot display panel provided by another embodiment of the present disclosure.

In some embodiments, as shown in FIG. 2, the quantum dot display panel 2 further comprises an external polarizer 40, the external polarizer 40 is disposed on a side of the array substrate 10 away from the liquid crystal layer 30.

In some embodiments, as shown in FIG. 2, a backlight source 50 is further disposed on a surface of a side of the external polarizer 40 away from the array substrate 10.

Figure 3:
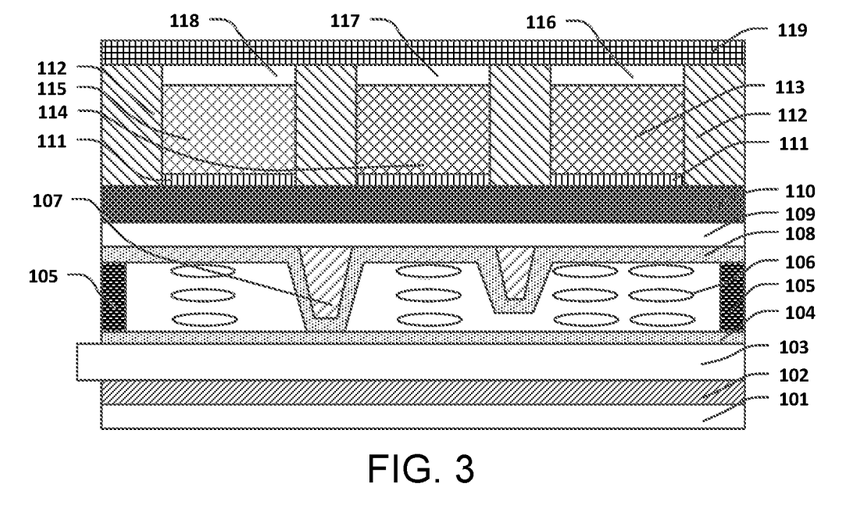
FIG. 3 is a schematic structural diagram of the quantum dot display panel provided by one embodiment of the present disclosure.
Figure 4:
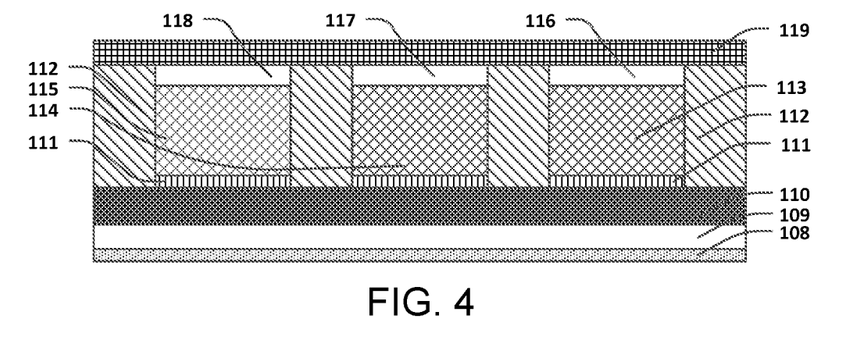
FIG. 4 is schematic structural diagram of a color film substrate of the quantum dot display panel in FIG. 3.

As shown in FIG. 3 and FIG. 4, the color film substrate 20 comprises a cover plate 119; light-cutoff layers 116, 117, and 118 disposed on a surface of a side of the cover plate 119 and provided with a plurality of through-holes; quantum dot pixel layers 113, 114, and 115 disposed on a surface of a side of the light-cutoff layers 116, 117, and 118 away from the cover plate 119, wherein the quantum dot pixel layers 113, 114, and 115 comprise a plurality of quantum dot pixel units, each quantum dot pixel unit comprises a red sub-pixel, a green sub-pixel, a blue sub-pixel, and two quantum dot pixel layers in each quantum dot pixel unit have different colors; a blocking layer 111 disposed on a surface of a side of the quantum dot pixel layers 113, 114, and 115 away from the light-cutoff layers 116, 117, and 118; a reflection layer 112 disposed on a surface of a side of the cover plate 119, filled in the plurality of through-holes, and surrounding the quantum dot pixel layers 113, 114, and 115 and the blocking layer 111; a coating layer 110 disposed on a surface of a side of the reflection layer 112 away from the cover plate 119 and simultaneously disposed on a surface of a side of the blocking layer 111 away from the quantum dot pixel layers 113, 114, and 115; a built-in polarizing layer 109 evenly coated on a surface of a side of the coating layer 110 away from the reflection layer 112; an isolation unit 107 disposed on a surface of a side of the built-in polarizing layer 109 away from the coating layer 110, wherein an orthographic projection of the isolation unit 107 on the cover plate 119 overlaps with an orthographic projection of a part of the reflection layer 112 on the cover plate 119; and a polyimide (PI) layer 108 attached to a surface of a side of the built-in polarizing layer 109 away from the coating layer 110 and covering an outer surface of the isolation unit 107. The present disclosure controls an on and off state of a quantum dot natural light through a cooperation of the external polarizer, the built-in polarizing layer, and the liquid crystal layer.

The PI layer 104 is disposed on a surface of a side of the array substrate 10, the PI layer 104 on the surface of the side of the array substrate 10 and the PI layer 108 on a surface of a side of the color film substrate 20 undergo a bonding process through the sealant 105, and liquid crystals are filled between thereof.

A thickness of the built-in polarizing layer 109 is less than 10 um. A thickness of traditional polarizer is about 200 microns. Compared with thereof, the thickness of the built-in polarizing layer provided by the present disclosure is significantly reduced, which can further realize lightness and thinness.

A material of the reflection layer 112 is a reflective photoresist.

The blocking layer 111 consists of a solvent, a polymer, a photosensitizer, and an additive.

The light-cutoff layer 116, 117, and 118 intercept light with a wavelength below 492 nm.

A purpose of setting the light-cutoff layers 116, 117, and 118 is to block excess blue light, because the quantum dot pixel layers 113, 114, and 115 do not block blue light enough. When blue light excites the quantum dot pixel layers 113, 114, and 115, a part of blue light will penetrate from the quantum dot pixel layers 113, 114, and 115 to affect color purity of light emitted by the quantum dot pixel layers 113, 114, and 115. Therefore, the light-cutoff layers 116, 117, and 118 are needed to block the excess blue light and other unnecessary light to ensure the color purity of the quantum dot pixel layers 113, 114, and 115, and obtain high-purity colors.

When a direction of light passing through the liquid crystal layer 30 is perpendicular to a polarization direction of the built-in polarizing layer 109, the quantum dot pixel layers 113, 114, and 115 display a dark state; and when the direction of light passing through the liquid crystal layer 30 is parallel to the polarization direction of the built-in polarizing layer 109, the quantum dot pixel layers 113, 114, and 115 emit light and display a light-emitting state.

Another embodiment of the present disclosure provides a quantum dot display device, and the quantum dot display device comprises the above quantum dot display panel comprising the array substrate 10, the color film substrate 20, the liquid crystal layer 30 disposed between the array substrate 10 and the color film substrate 20.

In some embodiments, as shown in FIG. 2, the quantum dot display panel 2 further comprises the external polarizer 40, and the external polarizer 40 is disposed on the side of the array substrate 10 away from the liquid crystal layer 30.

In some embodiments, as shown in FIG. 2, the backlight source 50 is further disposed on the surface of the side of the external polarizer 40 away from the array substrate 10.

As shown in FIG. 3 and FIG. 4, the color film substrate 20 comprises the cover plate 119; light-cutoff layers 116, 117, and 118 disposed on the surface of the side of the cover plate 119 and provided with the plurality of through-holes; quantum dot pixel layers 113, 114, and 115 disposed on the surface of the side of the light-cutoff layers 116, 117, and 118 away from the cover plate 119, wherein the quantum dot pixel layers 113, 114, and 115 comprise the plurality of quantum dot pixel units, each quantum dot pixel unit comprises the red sub-pixel, the green sub-pixel, the blue sub-pixel, and two quantum dot pixel layers in each quantum dot pixel unit have different colors; the blocking layer 111 disposed on the surface of the side of the quantum dot pixel layers 113, 114, and 115 away from the light-cutoff layers 116, 117, and 118; the reflection layer 112 disposed on the surface of the side of the cover plate 119, filled in the plurality of through-holes, and surrounding the quantum dot pixel layers 113, 114, and 115 and the blocking layer 111; the coating layer 110 disposed on the surface of the side of the reflection layer 112 away from the cover plate 119 and simultaneously disposed on the surface of the side of the blocking layer 111 away from the quantum dot pixel layers 113, 114, and 115; the built-in polarizing layer 109 evenly coated on the surface of the side of the coating layer 110 away from the reflection layer 112; the isolation unit 107 disposed on the surface of the side of the built-in polarizing layer 109 away from the coating layer 110, wherein the orthographic projection of the isolation unit 107 on the cover plate 119 overlaps with the orthographic projection of the part of the reflection layer 112 on the cover plate 119; and the PI layer 108 attached to the surface of the side of the built-in polarizing layer 109 away from the coating layer 110 and covering the outer surface of the isolation unit 107. The present disclosure controls an on and off state of a quantum dot natural light through a cooperation of the external polarizer, the built-in polarizing layer, and the liquid crystal layer.

The PI layer 104 is disposed on the surface of the side of the array substrate 10, the PI layer 104 on the surface of the side of the array substrate 10 and the PI layer 108 on the surface of the side of the color film substrate 20 undergo the bonding process through the sealant 105, and the liquid crystals are filled between thereof.

The thickness of the built-in polarizing layer 109 is less than 10 um. The thickness of traditional polarizer is about 200 microns. Compared with thereof, the thickness of the built-in polarizing layer provided by the present disclosure is significantly reduced, which can further realize lightness and thinness.

The material of the reflection layer 112 is the reflective photoresist.

The blocking layer 111 is made of the solvent, the polymer, the photosensitizer, and the additive.

The light-cutoff layer 116, 117, and 118 intercept light with the wavelength below 492 nm.

The purpose of setting the light-cutoff layers 116, 117, and 118 is to block excess blue light, because the quantum dot pixel layers 113, 114, and 115 do not block blue light enough. When blue light excites the quantum dot pixel layers 113, 114, and 115, the part of blue light will penetrate from the quantum dot pixel layers 113, 114, and 115 to affect color purity of light emitted by the quantum dot pixel layers 113, 114, and 115. Therefore, the light-cutoff layers 116, 117, and 118 are needed to block the excess blue light and other unnecessary light to ensure the color purity of the quantum dot pixel layers 113, 114, and 115, and obtain high-purity colors.

When the direction of light passing through the liquid crystal layer 30 is perpendicular to the polarization direction of the built-in polarizing layer 109, the quantum dot pixel layers 113, 114, and 115 display the dark state; and when the direction of light passing through the liquid crystal layer 30 is parallel to the polarization direction of the built-in polarizing layer 109, the quantum dot pixel layers 113, 114, and 115 emit light and display the light-emitting state.

Figure 5:
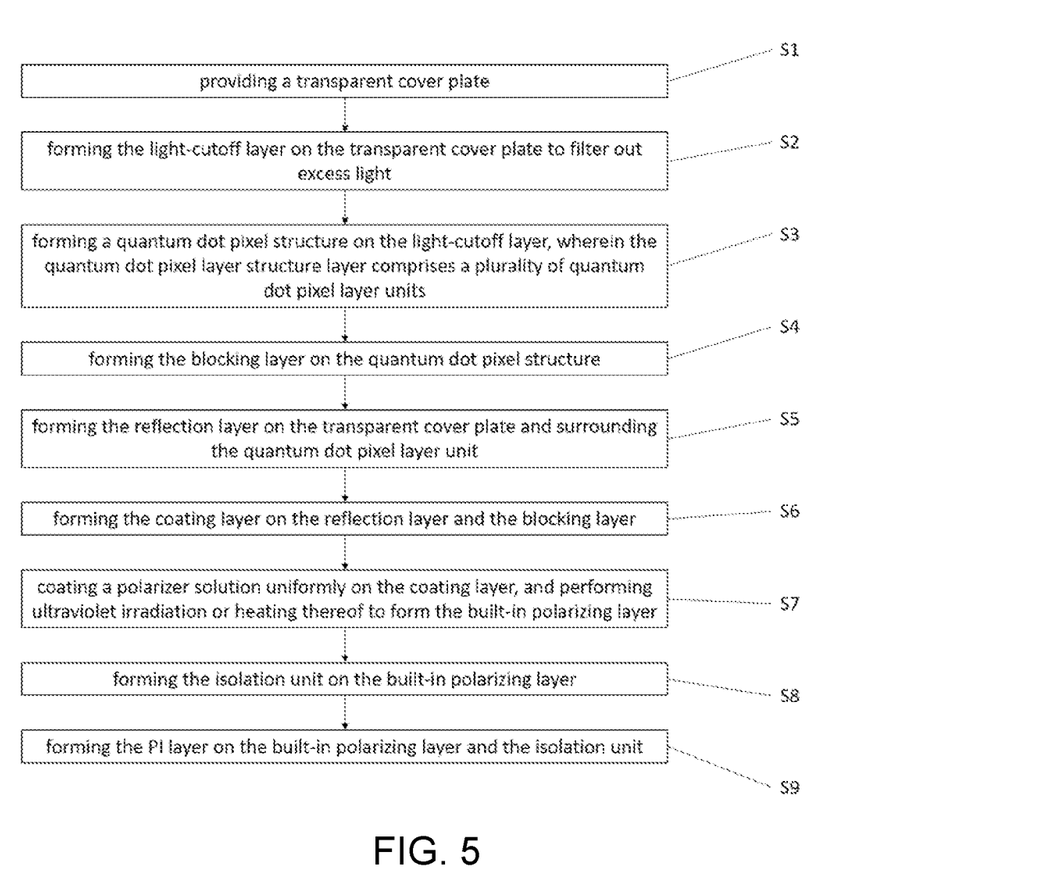
FIG. 5 is a schematic diagram of a preparation method of a quantum dot display device provided by the present disclosure.

As shown in FIG. 5, the other embodiment of the present disclosure provides a preparation method of the above quantum dot display device, wherein a preparation method of the color film substrate comprises step S1 to step S9 whose details as follows:

Step S1: providing a transparent cover plate.

Step S2: forming the light-cutoff layer on the transparent cover plate to filter out excess light.

Step S3: forming a quantum dot pixel structure on the light-cutoff layer, wherein the quantum dot pixel layer structure layer comprises a plurality of quantum dot pixel layer units.

Step S4: forming the blocking layer on the quantum dot pixel structure.

Step S5: forming the reflection layer on the transparent cover plate and surrounding the quantum dot pixel layer unit.

Step S6: forming the coating layer on the reflection layer and the blocking layer.

Step S7: coating a polarizer solution uniformly on the coating layer, and performing ultraviolet (UV) irradiation or heating thereof to form the built-in polarizing layer.

Step S8: forming the isolation unit on the built-in polarizing layer.

Step S9: coating the PI layer on the built-in polarizing layer and the isolation unit.

In some embodiments, the cover plate in step S1 may be a general glass cover plate or a specific cover plate. In the present embodiment, the cover plate is a general glass substrate.

In some embodiments, in step S2, the purpose of forming the light-cutoff layer is to block excess blue light, because the quantum dot pixel layer does not block blue light enough. When blue light excites the quantum dot pixel layer, a part of blue light will penetrate from the quantum dot pixel layer to affect color purity of light emitted by the quantum dot pixel layer. Therefore, one light-cutoff layer is needed to block the excess blue light and other unnecessary light to ensure the color purity of the quantum dot pixel layer, and obtain high-purity colors In other embodiments, the light-cutoff layer in step S2 intercepts light with a wavelength below 492 nm.

In some embodiments, each quantum dot pixel unit in step S3 comprises a red sub-pixel, a green sub-pixel, a blue sub-pixel, and two sub-pixels have different colors.

In some embodiments, the blocking layer in step S4 is made by a coating process, and its material may be a general photoresist. However, in other embodiments of the present disclosure, the blocking layer consists of a solvent, a polymer, a photosensitizer, and an additive.

In some embodiments, a material of the reflection layer in step S5 is a reflective photoresist, and a process used is also a general photolithography process.

In some embodiments, the coating layer in step S6 can be made by a general coating process.

In some embodiments, the built-in polarizing layer in step S7 adopts reactive liquid crystal or liquid crystal polymer for ultraviolet (UV) light irradiation, thermal curing, and other processes to realize a layer of film with polarizing function. A thickness of the built-in polarizing layer is less than 10 um. A thickness of traditional polarizer is about 200 microns. Compared with thereof, the thickness of the built-in polarizing layer provided by the present disclosure is significantly reduced, which can further realize lightness and thinness. Moreover, a manufacturing process of the built-in polarizing layer is relatively simple, and cost is low.

When a direction of light passing through the liquid crystal layer is perpendicular to a polarization direction of the built-in polarizing layer, the quantum dot pixel layer displays a dark state, and when the direction of light passing through the liquid crystal layer is parallel to the polarization direction of the built-in polarizing layer, the quantum dot pixel layer emits light and displays a light-emitting state.

In summary, the present disclosure controls an on and off state of a quantum dot natural light through a cooperation of the external polarizer, the built-in polarizing layer, and the liquid crystal layer. When the liquid crystal deflects so that light passing through the external polarizer is parallel to a polarization direction of the built-in polarizer layer, light from a backlight is irradiated to the quantum dot pixel layer through the polarizer, exciting the quantum dot pixel layer to emit light, thereby displaying the light-emitting state. When the liquid crystal deflects so that the light passing through the external polarizer is perpendicular to the polarization direction of the built-in polarizing layer, the light from the backlight cannot pass through, and the quantum dot pixel layer cannot be excited to emit light, thereby displaying the dark state.

The embodiment of the present disclosure provides the quantum dot display panel. The display panel comprises the array substrate, the color film substrate, the liquid crystal layer disposed between the array substrate and the color film substrate, wherein the color film substrate comprises the cover plate, the light-cutoff layer disposed on the surface of the side of the cover plate and provided with the plurality of through-holes, the quantum dot pixel layer disposed on the surface of the side of the light-cutoff layer away from the cover plate, wherein the quantum dot pixel layer comprises the plurality of quantum dot pixel units, each quantum dot pixel unit comprises the red sub-pixel, the green sub-pixel, the blue sub-pixel, and two quantum dot pixel layers in each quantum dot pixel unit have different colors, the blocking layer disposed on the surface of the side of the quantum dot pixel layer away from the light-cutoff layer, the reflection layer disposed on the surface of the side of the cover plate, filled in the plurality of through-holes, and surrounding the quantum dot pixel layer and the blocking layer, the coating layer disposed on the surface of the side of the reflection layer away from the cover plate and simultaneously disposed on the surface of the side of the blocking layer away from the quantum dot pixel layer, the built-in polarizing layer evenly coated on the surface of the side of the coating layer away from the reflection layer, the isolation unit disposed on the surface of the side of the built-in polarizing layer away from the coating layer, wherein the orthographic projection of the isolation unit on the cover plate overlaps with the orthographic projection of the part of the reflection layer on the cover plate, and the PI layer attached to the surface of the side of the built-in polarizing layer away from the coating layer and covering an outer surface of the isolation unit. The embodiment of the present disclosure controls an on and off state of a quantum dot natural light through a cooperation of the external polarizer, the built-in polarizing layer, and the liquid crystal layer. Moreover, by directly coating the polarizing solution in a cell to manufacture the built-in polarizing layer, the process is simple and the cost is saved.

In the above embodiments, description of each embodiment has its own emphasis. For a part that is not detailed in an embodiment, referring to the related descriptions of other embodiments.

The quantum dot display panel, the display device, and the preparation method there provided by the embodiments of the present disclosure have been described in detail above. The present disclosure uses specific examples to describe principles and embodiments of the present disclosure. The descriptions of the above embodiments are only used to help understand technical solutions of the present disclosure and core ideas thereof. Moreover, those of ordinary skill in the art should understand that the technical solutions described in the aforesaid embodiments can still be modified, or have some technical features equivalently replaced. However, these modifications or replacements do not depart from a scope of the technical solutions of the embodiments of the present disclosure.

What is claimed is:

1. A quantum dot display panel, comprising an array substrate, a color film substrate, a liquid crystal layer disposed between the array substrate and the color film substrate;
   wherein the color film substrate comprises:
   a cover plate;

a light-cutoff layer disposed on a surface of a side of the cover plate and provided with a plurality of through-holes;

a quantum dot pixel layer disposed on a surface of a side of the light-cutoff layer away from the cover plate, wherein the quantum dot pixel layer comprises a plurality of quantum dot pixel units, each quantum dot pixel unit comprises a red sub-pixel, a green sub-pixel, a blue sub-pixel, and two quantum dot pixel layers in each quantum dot pixel unit have different colors;

a blocking layer disposed on a surface of a side of the quantum dot pixel layer away from the light-cutoff layer;

a reflection layer disposed on a surface of a side of the cover plate, filled in the plurality of through-holes, and surrounding the quantum dot pixel layer and the blocking layer;

a coating layer disposed on a surface of a side of the reflection layer away from the cover plate and simultaneously disposed on a surface of a side of the blocking layer away from the quantum dot pixel layer;

a built-in polarizing layer disposed on a surface of a side of the coating layer away from the reflection layer, wherein the built-in polarizing layer is made of reactive liquid crystal or liquid crystal polymer, and a thickness of the built-in polarizing layer is less than 10 microns;

an isolation unit disposed on a surface of a side of the built-in polarizing layer away from the coating layer, wherein an orthographic projection of the isolation unit on the cover plate overlaps with an orthographic projection of a part of the reflection layer on the cover plate; and a polyimide (PI) layer attached to a surface of a side of the built-in polarizing layer away from the coating layer and covering an outer surface of the isolation unit;

wherein the quantum dot display panel further comprises an external polarizer disposed on a side of the array substrate away from the liquid crystal layer, and a backlight source disposed on a side of the external polarizer away from the array substrate and configured to emit blue light.

2. The quantum dot display panel as claimed in claim 1, wherein a material of the reflection layer is a reflective photoresist.

3. The quantum dot display panel as claimed in claim 1, wherein the blocking layer consists of a solvent, a polymer, a photosensitizer, and an additive.

4. The quantum dot display panel as claimed in claim 1, wherein the light-cutoff layer intercepts light with a wavelength below 492 nm.

5. The quantum dot display panel as claimed in claim 1, wherein the quantum dot display panel comprises an external polarizer, the external polarizer is disposed on a side of the array substrate away from the liquid crystal layer.

6. The quantum dot display panel as claimed in claim 5, wherein a backlight source is disposed on a surface of a side of the external polarizer away from the array substrate.

7. The quantum dot display panel as claimed in claim 6, wherein when a direction of light passing through the liquid crystal layer is perpendicular to a polarization direction of the built-in polarizing layer, the quantum dot pixel layer displays a dark state; and when the direction of light passing through the liquid crystal layer is parallel to the polarization direction of the built-in polarizing layer, the quantum dot pixel layer emits light and displays a light-emitting state.

8. A quantum dot display device comprising a quantum dot display panel, wherein the quantum dot display panel comprises an array substrate, a color film substrate, a liquid crystal layer disposed between the array substrate and the color film substrate;

wherein the color film substrate comprises:

a cover plate;

a light-cutoff layer disposed on a surface of a side of the cover plate and provided with a plurality of through-holes;

a quantum dot pixel layer disposed on a surface of a side of the light-cutoff layer away from the cover plate, wherein the quantum dot pixel layer comprises a plurality of quantum dot pixel units, each quantum dot pixel unit comprises a red sub-pixel, a green sub-pixel, a blue sub-pixel, and two quantum dot pixel layers in each quantum dot pixel unit have different colors;

a blocking layer disposed on a surface of a side of the quantum dot pixel layer away from the light-cutoff layer;

a reflection layer disposed on a surface of a side of the cover plate, filled in the plurality of through-holes, and surrounding the quantum dot pixel layer and the blocking layer;

a coating layer disposed on a surface of a side of the reflection layer away from the cover plate and simultaneously disposed on a surface of a side of the blocking layer away from the quantum dot pixel layer;

a built-in polarizing layer disposed on a surface of a side of the coating layer away from the reflection layer, wherein the built-in polarizing layer is made of reactive liquid crystal or liquid crystal polymer, and a thickness of the built-in polarizing layer is less than 10 microns;

an isolation unit disposed on a surface of a side of the built-in polarizing layer away from the coating layer, wherein an orthographic projection of the isolation unit on the cover plate overlaps with an orthographic projection of a part of the reflection layer on the cover plate; and a polyimide (PI) layer attached to a surface of a side of the built-in polarizing layer away from the coating layer and covering an outer surface of the isolation unit;

wherein the quantum dot display panel further comprises an external polarizer disposed on a side of the array substrate away from the liquid crystal layer, and a backlight source disposed on a side of the external polarizer away from the array substrate and configured to emit blue light.

9. A preparation method of a quantum dot display device comprising a quantum dot display panel, wherein the quantum dot display panel comprises an array substrate, a color film substrate, a liquid crystal layer disposed between the array substrate and the color film substrate; wherein a preparation method of the color film substrate comprises following steps:

providing a transparent cover plate;

forming a light-cutoff layer on the transparent cover plate to filter out excess light;

forming a quantum dot pixel layer structure on the light-cutoff layer, wherein the quantum dot pixel layer structure comprises a plurality of quantum dot pixel layer units;

forming a blocking layer on the quantum dot pixel layer structure;

forming a reflection layer on the transparent cover plate and surrounding the quantum dot pixel layer unit;

forming a coating layer on the reflection layer and the blocking layer;

coating a polarizer solution uniformly on the coating layer, and performing ultraviolet irradiation or heating thereof to form the built-in polarizing layer, wherein the polarizer solution comprises reactive liquid crystal or liquid crystal polymer, and a thickness of the built-in polarizing layer is less than 10 microns;

forming the isolation unit on the built-in polarizing layer; and coating the PI layer on the built-in polarizing layer and the isolation unit;

wherein the quantum dot display panel further comprises an external polarizer disposed on a side of the array substrate away from the liquid crystal layer, and a backlight source disposed on a side of the external polarizer away from the array substrate and configured to emit blue light.

\* \* \* \* \*